(12) United States Patent
Luo et al.

(10) Patent No.: US 12,085,980 B2
(45) Date of Patent: Sep. 10, 2024

(54) SUPPORT STRUCTURE AND ELECTRONIC APPARATUS

(71) Applicant: Lenovo (Beijing) Limited, Beijing (CN)

(72) Inventors: Yadi Luo, Beijing (CN); Zhigang Na, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 333 days.

(21) Appl. No.: 17/475,087

(22) Filed: Sep. 14, 2021

(65) Prior Publication Data

US 2022/0171427 A1   Jun. 2, 2022

(30) Foreign Application Priority Data

Dec. 1, 2020   (CN) .......................... 202011384121.2

(51) Int. Cl.
*G06F 1/16* (2006.01)
*F16C 11/12* (2006.01)
*F16M 11/10* (2006.01)

(52) U.S. Cl.
CPC ............ *G06F 1/1601* (2013.01); *F16C 11/12* (2013.01); *F16M 11/10* (2013.01)

(58) Field of Classification Search
CPC ........ G06F 1/1601; F16C 11/12; F16C 11/10; F16M 11/10; F16M 11/041; F16M 2200/041; F16M 11/20
USPC ................ 248/917, 918, 920, 921, 922, 923
See application file for complete search history.

(56) References Cited

U.S. PATENT DOCUMENTS

| | | | | |
|---|---|---|---|---|
| 7,478,789 B2 * | 1/2009 | Yukawa | ................... | G06F 1/16 248/371 |
| 7,698,784 B2 * | 4/2010 | Hsu | ........................ | F16M 11/10 16/337 |
| 7,766,297 B2 * | 8/2010 | Chih | ..................... | G06F 1/1601 248/920 |
| 7,971,834 B2 * | 7/2011 | Wang | .................... | E05D 11/087 361/679.06 |
| 8,944,396 B2 * | 2/2015 | Mau | ....................... | G06F 1/1601 248/292.12 |
| 8,967,569 B2 * | 3/2015 | Hsu | ........................ | F16M 11/10 248/920 |
| 9,687,076 B2 * | 6/2017 | Su | .......................... | G06F 1/1626 |
| 11,441,724 B2 * | 9/2022 | Huang | ................... | F16M 11/16 |

(Continued)

FOREIGN PATENT DOCUMENTS

| CN | 202812688 U | 3/2013 |
|---|---|---|
| CN | 205877608 U | 1/2017 |

*Primary Examiner* — Muhammad Ijaz
(74) *Attorney, Agent, or Firm* — ANOVA LAW GROUP, PLLC (57) ABSTRACT

A support structure for supporting objects of different weights includes a bracket, an elastic member, and an adjustment assembly. The bracket is configured to support different supported objects of different weights. The elastic member is arranged on the bracket and configured to deform elastically to provide torques for the supported objects. The adjustment assembly is connected between the bracket and the supported object. The adjustment assembly compresses the elastic member by the weights of the supported objects to produce torsional deformations of different degrees and enables the bracket to support the supported objects.

14 Claims, 6 Drawing Sheets

(56) References Cited

U.S. PATENT DOCUMENTS

| | | | | |
|---|---|---|---|---|
| 2003/0122046 | A1* | 7/2003 | Huong | E05D 11/087 |
| | | | | 248/922 |
| 2005/0108854 | A1* | 5/2005 | Lee | F16M 11/10 |
| | | | | 16/340 |
| 2007/0262210 | A1* | 11/2007 | Oh | F16M 11/28 |
| | | | | 248/917 |
| 2008/0117574 | A1* | 5/2008 | Lee | G06F 1/1601 |
| | | | | 361/679.06 |
| 2008/0232051 | A1* | 9/2008 | Zhou | F16M 11/10 |
| | | | | 248/920 |
| 2009/0158554 | A1* | 6/2009 | Chang | F16M 11/10 |
| | | | | 16/241 |
| 2012/0248048 | A1* | 10/2012 | Wu | F16M 11/10 |
| | | | | 211/26 |
| 2012/0250232 | A1* | 10/2012 | Li | F16M 11/041 |
| | | | | 361/679.01 |
| 2012/0273449 | A1* | 11/2012 | Hsu | F16M 11/2021 |
| | | | | 211/195 |
| 2013/0112818 | A1* | 5/2013 | Hsu | F16M 11/2021 |
| | | | | 248/121 |
| 2014/0252180 | A1* | 9/2014 | Mau | F16M 11/2021 |
| | | | | 248/123.11 |
| 2014/0252181 | A1* | 9/2014 | Mau | E05D 3/12 |
| | | | | 248/125.1 |
| 2017/0298982 | A1* | 10/2017 | Chu | E05D 11/084 |
| 2022/0247849 | A1* | 8/2022 | Liao | H04M 1/04 |
| 2022/0252208 | A1* | 8/2022 | Huang | F16M 11/2021 |
| 2023/0076389 | A1* | 3/2023 | Olson | F16M 11/38 |

* cited by examiner

SUPPORT STRUCTURE AND ELECTRONIC APPARATUS

CROSS-REFERENCE TO RELATED APPLICATION

This application claims priority to Chinese Patent Application No. 202011384121.2, filed on Dec. 1, 2020, the entire content of which is incorporated herein by reference.

TECHNICAL FIELD

The present disclosure generally relates to the electronic apparatus technology field and, more particularly, to a support structure and an electronic apparatus.

BACKGROUND

Currently, electronic apparatuses, e.g., monitors of computers, are supported on desktops through brackets. Since the monitors have different sizes and weights according to the different sizes, when the brackets are used to support the monitors, different monitors need to match the brackets with different torques. Thus, the brackets cannot be used universally, which increases manufacturing cost for the electronic apparatus and impairs user experience.

SUMMARY

Embodiments of the present disclosure provide a support structure for supporting objects of different weights, including a bracket, an elastic member, and an adjustment assembly. The bracket is configured to support different supported objects of different weights. The elastic member is arranged on the bracket and configured to deform elastically to provide torques for the supported objects. The adjustment assembly is connected between the bracket and the supported object. The adjustment assembly compresses the elastic member by the weights of the supported objects with different weights to produce torsional deformations of different degrees and enables the bracket to support the supported objects in use.

Embodiments of the present disclosure provide an electronic apparatus, including a display device and a support structure. The support structure includes a bracket, an elastic member, and an adjustment assembly. The bracket is configured to support different display devices of different weights. The elastic member is arranged on the bracket and configured to deform elastically to provide torques for the display devices. The adjustment assembly is connected between the bracket and the display device. The adjustment assembly compresses the elastic member by the weights of the display devices with different weights to produce torsional deformations of different degrees and enables the bracket to support the display devices.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

REFERENCE NUMERALS

1—Bracket, 2—Supported object, 3—Elastic member, 4—Slot member, 5—Slot, 6—Adjustment member, 7—First shaft, 8—Second shaft, 9—Decoration member.

DETAILED DESCRIPTION OF THE EMBODIMENTS

The present disclosure provides a support structure, which is universal and may support monitors with different weights. The present disclosure further provides an electronic apparatus, which includes the support structure.

The technical solution of embodiments of the present disclosure is described in detail in connection with the accompanying drawings. Described embodiments are merely some embodiments of the present disclosure, not all embodiments. Based on embodiments of the present disclosure, all other embodiments obtained by those of ordinary skill in the art without creative effort are within the scope of the present disclosure.

As shown in FIG. 1 to FIG. 6, embodiments of the present disclosure provide a support structure. The support structure may be configured for an electronic apparatus, including an assembly that needs to be supported. For example, the support structure may be configured to support an all-in-one computer, a desktop computer monitor, etc. The support structure includes a bracket 1, an elastic member 3, and an adjustment assembly. The bracket 1 may include a member that is installed with a supported object 2 (e.g., an all-in-one computer, a desktop computer monitor, etc.) and carries the weight of the support object 2. Different supported objects 2 may be rotatably arranged at the top of the bracket 1. The different supported objects 2 may refer to supported objects 2 with different weights (or weights).

The elastic member 3 is arranged on the bracket 1 and includes a member that provides torque to the supported object 2. The elastic member 3 may provide the torque to the supported object 2 to cause the supported object 2 to stay in a rotated position. The torque may be provided by the elastic member 3 through elastic deformation of the elastic member 3, such that an elastic force may be applied on the supported object 2. That is, the elastic force provided by the elastic member 3 on the supported object 2 is the torque provided to the supported object 2. An adjustment member is connected between the bracket 1 and the supported object 2. The adjustment member may adjust a magnitude of the elastic force or the torque. The elastic member 3 is compressed to deform elastically with different degrees under the action of the supported object 2 with different weights. The elastic deformation may cause the elastic member 3 to apply different magnitudes of the elastic force on the supported object 2 with different weights. As such, the torque may be automatically adjusted for different supported objects 2. Thus, the torque received by the supported object 2 may correspond to the gravity of the supported object 2. In this way, the torque received by the supported object 2 may be sufficient to cause the supported object 2 to stay in the rotated position. That is, the bracket 1 may support different supported objects 2. For example, the bracket 1 may support monitors of 21-inch to 27-inch (the weights of the monitors of 21-inch to 27-inch increasing as the sizes of the monitors increasing). The above-mentioned in-use support may mean that the supported object 2 may be in a normal use attitude when the bracket 1 supports the supported object 2.

The above-mentioned support structure may automatically adjust the torque according to different weights of different supported objects 2. Therefore, the support structure may be suitable for supporting a variety of different supported objects 2. That is, the support structure may be universal. Manufacturers may no longer need to customize a variety of different brackets 1 for the supported objects 2 with different weights. Thus, the manufacturing cost of the electronic apparatus having the support structure may be reduced. The users may be also allowed to use the support structure to support different supported objects 2. The users may use the support structure more conveniently.

Figure 1:
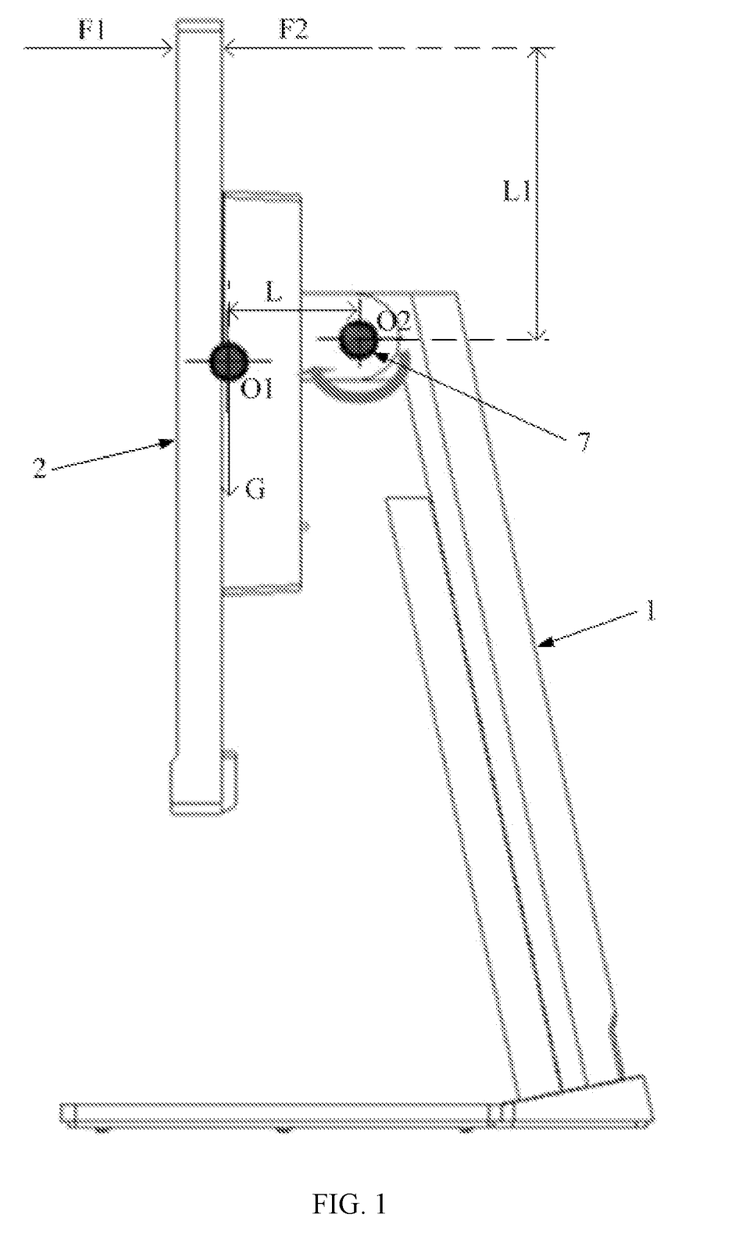
FIG. 1 illustrates a schematic side view showing a support structure supporting a supported object according to some embodiments of the present disclosure.

In some embodiments, a calculation method of the torque required by the different supported objects 2 is as follows. As shown in FIG. 1, point O1 is a center of gravity of the supported object 2, G is a gravity of the supported object 2, and point O2 is an axis center of rotation of the supported object 2 on the bracket 1 (that is, the axis center of the first shaft 7 described later). F1 or F2 is the force required by the user rotating the supported object 2 (F1 and F2 are equal in magnitude and opposite in direction). L1 is the moment of F1 or F2. L is the moment of G. Based on above, the torque NT of the supported object 2 is NT=F2*L1+G*L.

Figure 2:
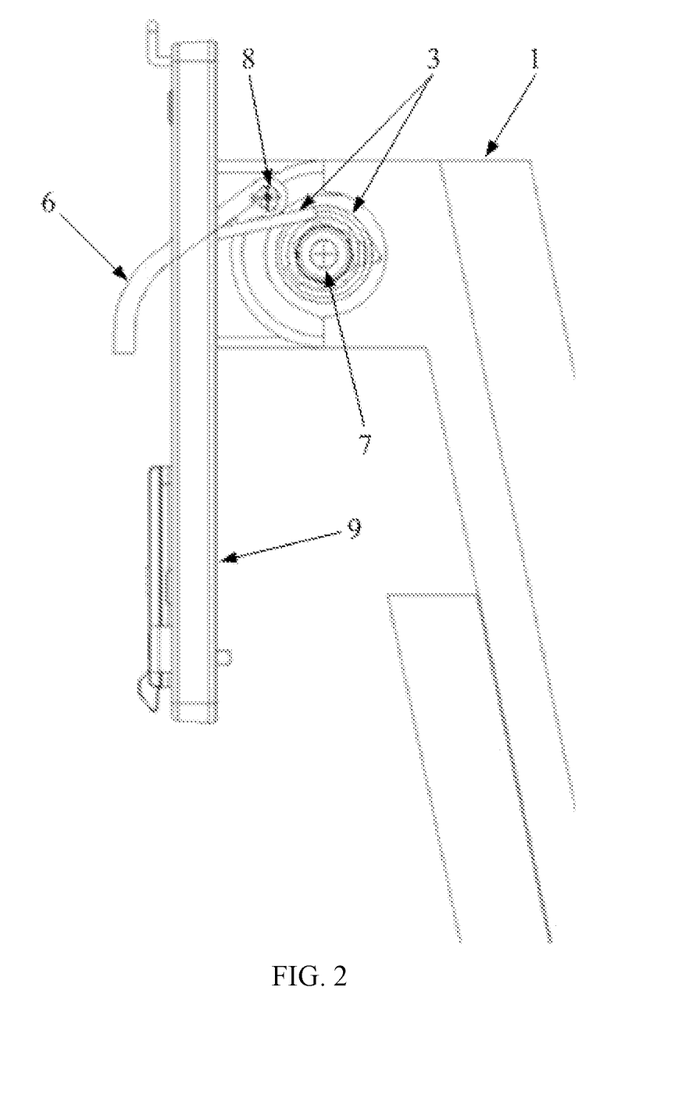
FIG. 2 illustrates a schematic side view of a support structure according to some embodiments of the present disclosure.
Figure 3:
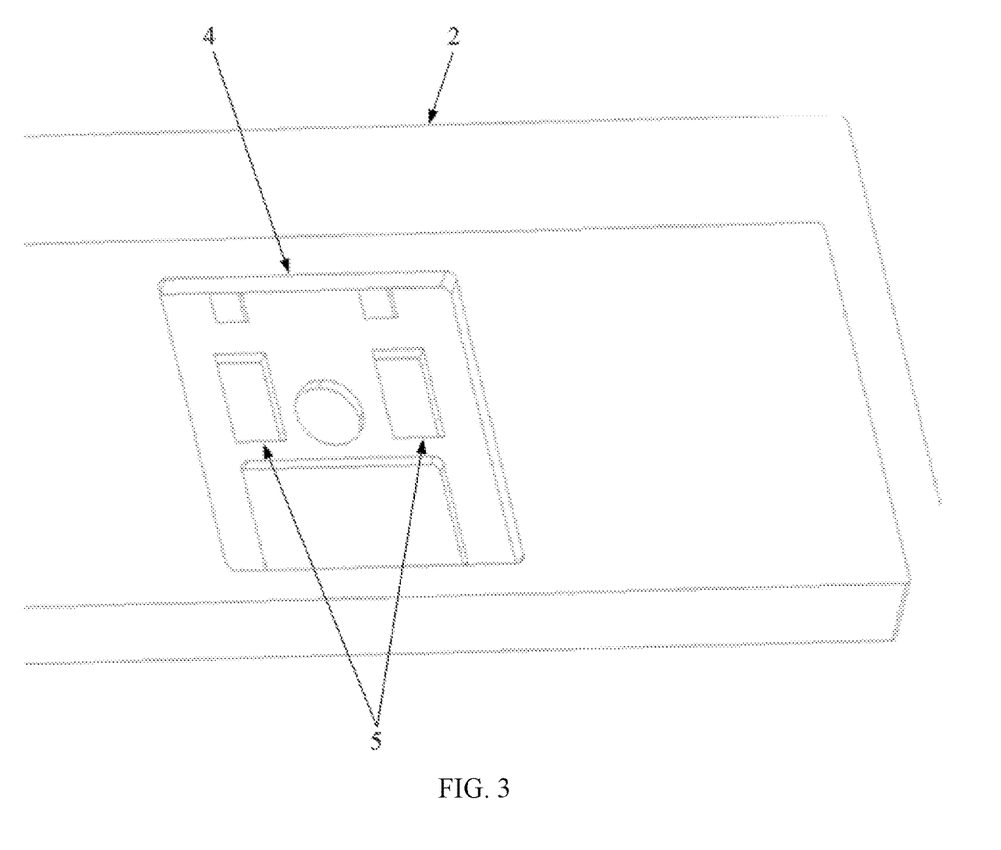
FIG. 3 illustrates a schematic structural diagram showing a slot member arranged at the supported object according to some other embodiments of the present disclosure.
Figure 4:
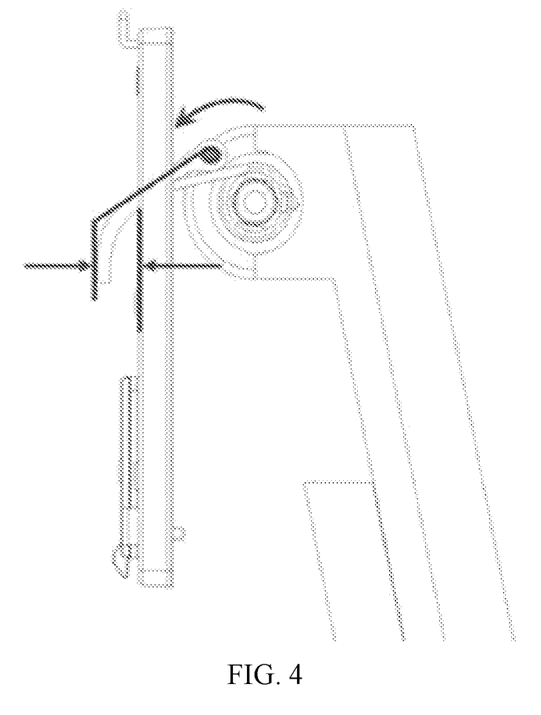
FIG. 4 illustrates a schematic diagram showing an adjustment member with a displacement according to some other embodiments of the present disclosure.
Figure 5:
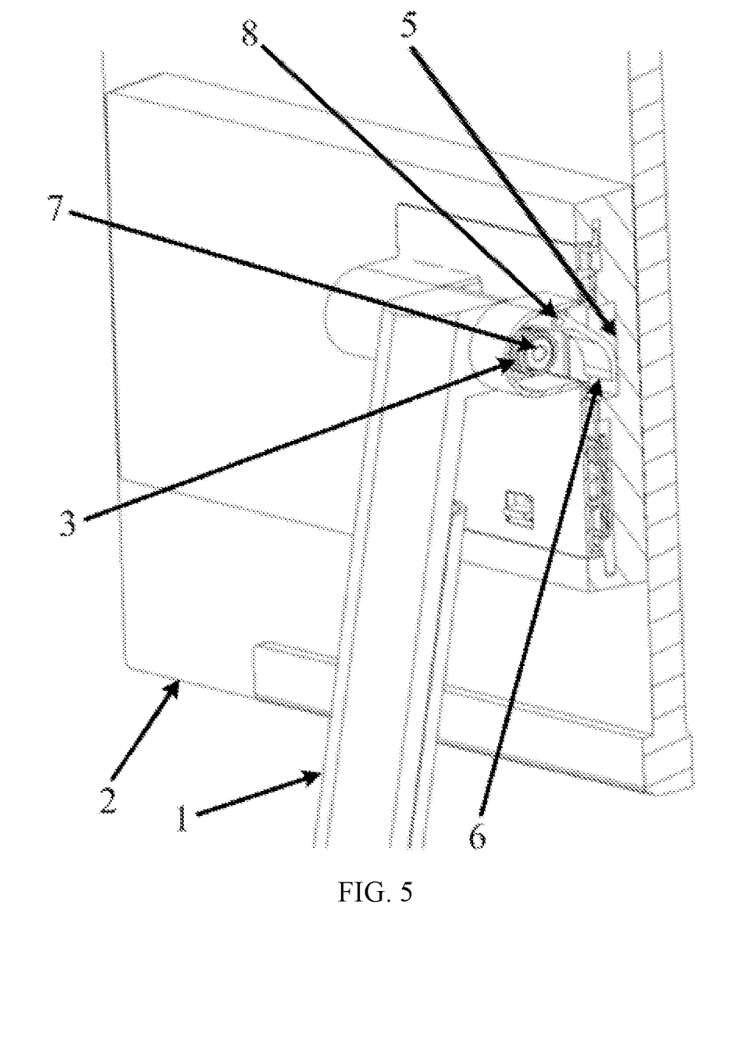
FIG. 5 illustrates a schematic cross-sectional diagram showing the support structure that supports the supported object according to some other embodiments of the present disclosure.

In some embodiments, as shown in FIGS. 2 and 3, a slot member 4 is arranged at the supported object 2. A slot 5 is provided on the slot member 4. The adjustment assembly includes an adjustment member 6 that may drive the elastic member 3 to deform elastically. The adjustment member 6 abuts against a bottom wall of the slot 5. That is, in the present disclosure, a structure in which the slot member 4 may cooperate with the adjustment member 6 may be chosen. The slot member 4 may cooperate with the adjustment member 6 as follows. The slot member 4 may be arranged on a surface of the supported object 2 close to the bracket 1. The slot 5 may be arranged on the slot member 4. An opening direction of the slot 5 may face a side where the bracket 1 is located. The adjustment member 6 may drive the elastic member 3 to deform elastically. When the adjustment member 6 extends into the slot 5 and abuts against the bottom wall of the slot 5, the bottom wall of the slot 5 may block and position the adjustment member 6. Thus, the adjustment member 6 may no longer move or rotate. As such, the adjustment member 6 cannot drive the elastic member 3 to deform elastically. Thus, the torque applied on the supported object 2 by the elastic member 3 through the adjustment member 6 and the bottom wall of the slot 5 may not change. The torque may support the supported object 2 in use on the bracket 1.

When the supported objects 2 with different weights are arranged on the bracket 1, the torque may change in the following ways. Depths of the slots 5 of the slot members 4 provided on the different supported objects 2 may be different. The adjustment member 6 may abut against the slots 5 with different depths. Thus, the elastic member 3 may have different degrees of deformation. That is, a supported object 2 with a gravity may correspond to one depth of a slot 5. The greater the gravity is, the smaller the depth of the slot 5 on the supported object 2 is. As the depth of the slot 5 changes, the distance between the bracket 1 and the bottom wall of the slot 5 may change. Thus, displacement (that is, a distance between the two arrows in FIG. 4) of the adjustment member 6 arranged on the bracket 1 may change. The change of the displacement may change the degree of the adjustment member 6 compressing the elastic member 3. That is, the elastic deformation of the elastic member 3 may change to change the torque.

Based on the above-mentioned structure, as shown in FIG. 2 and FIG. 4 to FIG. 6, the adjustment member 6 is rotatably arranged on the bracket 1. The adjustment member 6 abuts against the slots 5 with different depths by rotating the adjustment member 6 with different angles. As such, the elastic member 3 may elastically deform in different degrees to provide different torques of different magnitudes to different supported objects 2. In such a structure, the adjustment member 6 is in an initial position when the adjustment member 6 is not in contact with the slot 5 (or when the supported object 2 is not arranged on the bracket 1). When the adjustment member 6 is in the initial position, the adjustment member 6 may not compress the elastic member 3. A first supported object with a lowest gravity and a first depth slot may be arranged on the bracket 1. Since a first depth value is a largest depth value, the adjustment member 6 may only rotate by a first angle when abutting against the bottom wall of the slot of the first supported object. The first angle may be a smallest angle. That is, the adjustment member 6 may produce a smallest displacement. The elastic member 3 may be compressed to a minimum degree (that is, the elastic member 3 is relatively relaxed). The torque applied to the first supported object may be the smallest.

The first supported object may include, for example, a 21-inch monitor. A second supported object with a slot of a second depth may be arranged on the bracket 1. Since the gravity of the second supported object is greater than the gravity of the first supported object, and a second depth value is less than the first depth value, the adjustment member 6 rotates a second angle when abutting against the bottom wall of the slot of the second supported object. The second angle may be greater than the first angle. Therefore, the elastic member 3 may be more compressed. The torque applied to the second supported object may be increased compared to the torque of the first supported object. For example, the second supported object may include a 24-inch monitor. A third supported object with a slot of a third depth may be arranged on the bracket 1. Since the gravity of the third supported object is greater than the gravity of the second supported object, and the third depth value is less than the second depth value, the adjustment member 6 may rotate a third angle when abutting against the bottom wall of the third slot. The third angle may be larger than the second angle. Therefore, the displacement of the adjustment member 6 may be further increased. The elastic member 3 may also be more compressed. The torque applied to the third supported object by the adjustment member 6 may be increased compared to the torque of the second supported object. For example, the third supported object may include a 27-inch monitor. The case of the support structure supporting the supported object 2 with a greater gravity may be derived by analogy. To ensure that the support structure provided by the present disclosure may at least support the 21-inch monitor in use, the standard torque provided by the elastic member 3 may correspond to the gravity of the 21-inch monitor.

In addition, the adjustment member 6 may also drive the elastic member 3 to deform to different degrees in another manner. For example, the adjustment member 6 may slide along a straight line on the bracket 1 and drive the elastic member 3 to deform to different degrees by sliding different distances.

As shown in FIG. 2 and FIG. 4 to FIG. 6, a first shaft 7 is arranged on the bracket 1. The elastic member 3 includes a torsion spring sleeved on the first shaft 7. In two extension ends of the torsion spring, one of the extension ends is connected to the bracket 1, and the other extension end is connected to the adjustment member 6. That is, in the present disclosure, the rotating adjustment member 6 may drive the torsion spring to generate torsional deformations at different degrees to provide torques of different magnitudes for different supported objects 2. The first shaft 7 may be a member that is rotatably connected to the supported object 2. The torsion spring may be sleeved on the first shaft 7 to realize the installation on the bracket 1. One of the two extension ends of the torsion spring is fixedly connected to the bracket 1 to achieve circumferential and axial positioning relative to the first shaft 7. The other extension end is connected to the adjustment member 6, so that the adjustment member 6 may drive this end to rotate around the first shaft 7 when the adjustment member 6 rotates to realize the torsional deformation of the torsion spring. With such a structure, in addition to setting the first shaft 7 so that the supported object can rotate on the bracket 1, a torsion spring is sleeved on the first shaft 7 to provide the torque to cause the torsion structure and the rotation structure to be better combined. Moreover, a rotation space and a deformation space required by the torsional deformation method are relatively small, which can cause the structure of the support structure to be simpler, smaller in volume, and more beautiful in appearance.

As shown in FIG. 2 and FIG. 4 to FIG. 6, a second shaft 8 (the second shaft 8 is a part of the adjustment assembly) parallel to the first shaft 7 is also arranged on the bracket 1. One end of the adjustment member 6 is rotatably connected to the second shaft 8. The other end of the adjustment member 6 is an arc-shaped end and abuts against the bottom wall of the slot 5 with an arc surface. The adjustment member 6 of the present disclosure may drive the elastic member 3 to elastically deform through rotation. At the same time, to avoid interference with components (such as a torsion spring) arranged on the first shaft 7, the second shaft 8 is arranged on the bracket 1. One end of the adjustment member 6 is rotatably connected to the second shaft 8, so that the adjustment member 6 may rotate around the second shaft 8 to drive the torsion spring to deform. The other end of the adjustment member 6 protrudes relative to the bracket 1. An arc-shaped setting of the other end of the adjustment member 6 may make the other end to abut against and slide more smoothly on the bottom wall of the slot 5. The adjustment member 6 may be avoided from being stuck in the slot 5 during the installation process of the supported object 2 and during the rotation process. Thus, the support structure may work normally.

In addition, the adjustment member 6 may also be rotatably arranged on the first shaft 7 without affecting the normal operation of the first shaft 7 and other components arranged on the first shaft 7.

Figure 6:
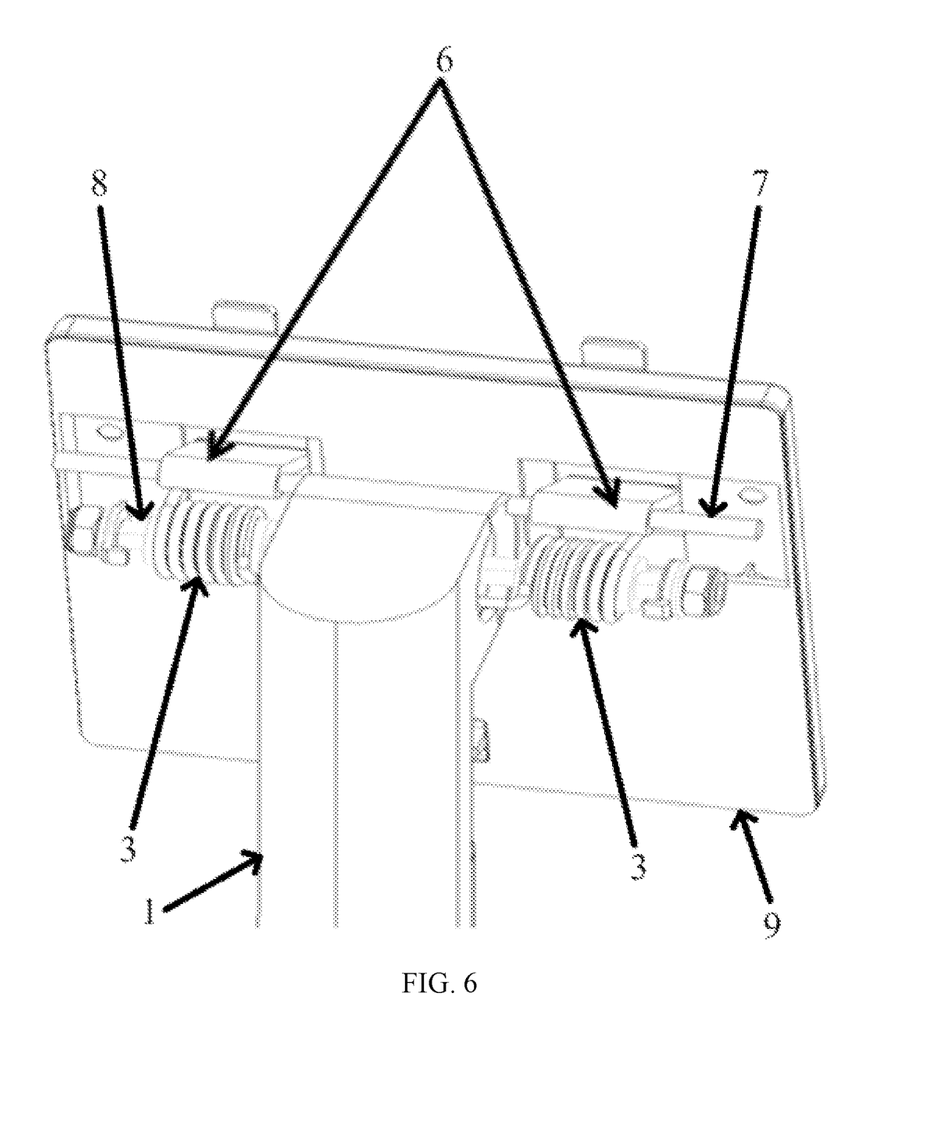
FIG. 6 illustrates a schematic rear view of the support structure according to some other embodiments of the present disclosure.

Further, as shown in FIG. 6, a plurality of elastic members 3 are arranged coaxially. The plurality of elastic members 3 are located on both sides of the bracket 1. A plurality of the adjustment members 6 are arranged one-to-one with the elastic members 3. With such arrangement, the support structure of the present disclosure may be more stable and may sufficiently provide different supported objects 2 with torques of corresponding amplitudes. The operation performance of the support structure may be improved. As shown in FIG. 6, two elastic members 3 are arranged on the first shaft 7, and two adjustment members 6 are arranged at the second shaft 8. Two elastic members 3 and two adjustment members 6 are arranged in a one-to-one correspondence. Correspondingly, as shown in FIG. 3, two slots 5 are arranged on the slot member 4.

In addition, the present disclosure also provides an electronic apparatus. The electronic apparatus includes a display device and a support structure. The support structure includes a bracket 1. The bracket 1 may be configured to support different display devices. Different display devices may have different weights. The support structure also includes an elastic member 3. The elastic member 3 may be arranged on the bracket 1. The elastic member 3 may provide torque to the display device through elastic deformation. The support structure further includes an adjustment assembly. The adjustment assembly may be connected between the bracket 1 and the display device. The adjustment member may compress the elastic member 3 to produce elastic deformations of different degrees under the action of the display devices with different weights to make the bracket 1 support the different display devices in use.

The electronic apparatus of the present disclosure includes the above-mentioned support structure. The support structure may support the display devices of different weights. Thus, the support structure may be universal. Manufacturers may no longer need to customize a variety of different brackets 1 for the supported objects 2 with different weights. Thus, the manufacturing cost of the electronic apparatus having the support structure may be reduced. The users may also be allowed to use the support structure to support different supported objects 2. The users may use the support structure conveniently.

The electronic apparatus may include the above-mentioned integrated computer or desktop computer. The display device may include the above-mentioned monitor.

In some embodiments, when the bracket 1 supports the display device in use, the display surface of the display device and the placement surface of the bracket 1 may satisfy a perpendicular condition. That is, when the bracket 1 supports the display device, the user needs to use the display device normally. As such, the display surface of the display device may need to face the user. Based on this, in the present disclosure, the display surface of the display device and the placement surface of the bracket 1 may satisfy the perpendicular condition. "Satisfy the perpendicular condition" means that the display surface and the desktop may be perpendicular to each other. That is, an angle between the display surface and the desktop may be 90°. In some embodiments, the display surface may be approximately perpendicular to the desktop. That is, the angle between the display surface and the desktop may be close to 90°. For example, the angle between the display surface and the desktop may be 80° to 100°.

In some embodiments, a slot member 4 is also arranged at the display device. The slot member 4 and the housing of the display device may be an integral structure or separate structures. The slot member 4 may include a slot 5 and abut against the adjustment member 6. The slot member 4 is arranged on the surface of the display device close to the support structure. The slot member 4 may be connected to the rear housing of the display device in a plurality of ways. For example, the slot member 4 may be a separate member. The slot member may be connected to the rear housing of the display device through installation. In some other embodiments, the slot member 4 and the rear housing of the display device may be integrally formed. That is, the slot 5 may be directly formed on the surface of the rear housing when the rear housing is injection-molded.

In addition, as shown in FIG. 2 and FIG. 4 to FIG. 6, a decorative member 9 is arranged on the bracket 1. The decoration member 9 may be configured to cover the arc-shaped end of the adjustment member 6 and the slot member 4 to make the appearance of the display device more beautiful.

For example, when the above-mentioned support structure supports the monitors of different sizes (the different sizes of the monitors having different weights), the specific conditions are as follows.

When the support structure supports a 21-inch monitor, G=3.2 kg, L1=133.6 mm, L=42.2 mm, F2=1.2 kgf.cm. The torque NT=F2*L1+G*L=1.2*13.36+3.2*4.22=29.53 kgf.cm. Since there are two elastic pieces, the torque required by a single elastic piece is 29.53/2=14.7 kgf.cm.

When the support structure supports a 24-inch monitor, G=3.8 kg, L1=154.6 mm, L=43.25 mm, F2=1.2 kgf.cm. The torque NT=F2*L1+G*L=1.2*15.46+3.8*4.33=35 kgf.cm. Since there are two elastic members, the torque required for a single elastic member is 35/2=17.5 kgf.cm.

When the support structure supports a 27-inch monitor, G=4.9 kg, L1=181.55 mm, L=43.62 mm, F2=1.2 kgf.cm. The torque NT=F2*L1+G*L=1.2*18.12+4.9*4.36=43.1 kgf.cm. Since there are two elastic pieces, the torque required by a single elastic piece is 43.1/2=22.55 kgf.cm.

At the same time, since the standard torque provided by the elastic member corresponds to the gravity of the 21-inch monitor, the minimum angle of the adjustment member when the support structure supports the monitor may be a pre-compressed angle of the elastic member corresponding to the 21-inch display (that is, the pre-compression angle of the elastic member is the same as the angle where the adjustment member is located). The pre-compression angle is the angle of 25°. The pre-compression angle of the elastic member corresponding to a 24-inch monitor is 35°. The pre-compression angle of the elastic member corresponding to a 27-inch monitor is 52°. That is, when the support structure is changed from supporting the 21-inch monitor to supporting the 24-inch monitor, the adjustment member needs to be rotated for an angle of 10° (that is, 35°−25°=10°). When the support structure is changed from supporting the 24-inch monitor to supporting the 27-inch monitor, the adjustment member needs to be rotated for an angle of 17° (that is, 52°−35°=17°). When the support structure is changed from supporting the 21-inch monitor to supporting the 27-inch monitor, the adjustment member needs to be rotated for an angle of 27° (that is, 52°−25°)=27°).

In addition, since the displacement of the arc-shaped end of the adjustment member (that is, the distance between the two arrows in FIG. 4) each time increases by 1 mm during the rotation process, the pre-compression angle of the elastic member will be caused to change by 3°. Thus, when the support structure is changed from supporting the 24-inch monitor to supporting the 27-inch monitor, the displacement of the adjustment member may be 17/3=6 mm. That is, the depth of the slot on the 27-inch monitor needs to be 6 mm greater than the depth of the slot on the 24-inch monitor. Similarly, the depth of the slot on the 27-inch monitor needs to be 9 mm greater than the depth of the slot on the 21-inch monitor. The depth of the slot on the 24-inch monitor needs to be 3 mm greater than the depth of the slot on the 21-inch monitor.

The structure of each part is described in a progressive manner in the present disclosure. The description of the structure of each part focuses on the difference from the existing structure. The overall and partial structure of the support structure may be obtained by combining the structure described in the above paragraphs.

The above description of embodiments of the present disclosure enables those skilled in the art to implement or use the present disclosure. Various modifications to these embodiments will be obvious to those skilled in the art. The general principles defined in the specification may be implemented in other embodiments without departing from the spirit or scope of the present disclosure. Therefore, the present disclosure will not be limited to the embodiments shown in the specification, but should conform to the widest scope consistent with the principles and novel features disclosed in the specification.

What is claimed is:

1. A support structure, comprising:
a bracket configured to support different supported objects, the different supported objects of different weights;
an elastic member arranged on the bracket and configured to deform elastically to provide torques for the supported objects;
an adjustment member rotatably arranged on the bracket and connected between the bracket and the supported object, the adjustment member being configured to abut against the supported object and compress the elastic member by the weights of the supported objects through rotation for different angles to cause the elastic member to produce torsional deformations of different degrees to provide torsion of different magnitudes for the supported objects, enabling the bracket to support the supported objects.

2. The support structure of claim 1, wherein:
a slot member is arranged on each of the supported objects;
a slot is arranged on the slot member;
the adjustment member is configured to abut against a bottom wall of the slot.

3. The support structure of claim 2, wherein:
depths of the slots arranged on the supported objects are different; and
the adjustment member is configured to abut against the slots with different depths to cause the elastic member to deform at different degrees.

4. The support structure of claim 1, wherein:
the bracket includes a first shaft;
the elastic member includes a torsion spring sleeved on the first shaft, one of two extension ends of the torsion spring being connected to the bracket, and the other one of the two extension ends of the torsion spring being connected to the adjustment member.

5. The support structure of claim 1, wherein:
the bracket includes a second shaft parallel to a first shaft;
an end of the adjustment member is connected to the second shaft; and
the other end of the adjustment member is an arc-shaped end and configured to abut against the supported object through an arc surface.

6. The support structure of claim 1, wherein:
the elastic member is one of a plurality of elastic members arranged coaxially and located on two sides of the bracket; and
the adjustment member is one of a plurality of adjustment members arranged to be in a one-to-one correspondence with the plurality of elastic members.

7. An electronic apparatus, comprising:
a display device; and
a support structure including:
　a bracket configured to support different display devices of different weights;
　an elastic member arranged on the bracket and configured to deform elastically to provide torques for the display devices;
　an adjustment member rotatably arranged on the bracket and connected between the bracket and the display device, the adjustment assembly member being configured to abut against the display device and compress the elastic member by the weights of the display devices through rotation for different angles to cause the elastic member to generate torsional deformations of different degrees to provide torsion of different magnitudes for the display devices, enabling the bracket to support the display devices.

8. The electronic apparatus of claim 7, wherein when the bracket supports the display device in use, a display surface of the display device and a placement surface of the bracket satisfy a perpendicular condition.

9. The electronic apparatus of claim 7, wherein:
the display device includes a slot member; and
the slot member and a housing of the display device are an integral structure or separate structures.

10. The electronic apparatus of claim 7, wherein:
a slot member is arranged on each of the display devices;
a slot is arranged on the slot member;
the adjustment member is configured to abut against a bottom wall of the slot.

11. The electronic apparatus of claim 10, wherein:
depths of the slots arranged on the display device are different; and
the adjustment member is configured to abut against the slots with different depths to cause the elastic member to deform at different degrees.

12. The electronic apparatus of claim 7, wherein:
the bracket includes a first shaft;
the elastic member includes a torsion spring sleeved on the first shaft, one of two extension ends of the torsion spring being connected to the bracket, and the other one of the two extension ends of the torsion spring being connected to the adjustment member.

13. The electronic apparatus of claim 7, wherein:
the bracket includes a second shaft parallel to a first shaft;
an end of the adjustment member is connected to the second shaft; and
the other end of the adjustment member is an arc-shaped end and is configured to abut against the display device through an arc-shaped surface.

14. The electronic apparatus of claim 7, wherein:
the elastic member is one of a plurality of elastic members arranged coaxially and located on two sides of the bracket; and
the adjustment member is one of a plurality of adjustment members arranged to be in a one-to-one correspondence with the plurality of elastic members.

* * * * *